United States Patent
Kluge

[11] Patent Number: 6,142,444
[45] Date of Patent: Nov. 7, 2000

[54] PIEZOELECTRICALLY ACTUATED MICROVALVE

[75] Inventor: Stefan Kluge, München, Germany

[73] Assignee: Fraunhofer-Gesellschaft zur Förderung der angewandten Forschung e.V., Munich, Germany

[21] Appl. No.: 09/308,549

[22] PCT Filed: Nov. 20, 1997

[86] PCT No.: PCT/EP97/06498

§ 371 Date: May 20, 1999

§ 102(e) Date: May 20, 1999

[87] PCT Pub. No.: WO98/23869

PCT Pub. Date: Jun. 4, 1998

[30] Foreign Application Priority Data

Nov. 25, 1996 [DE] Germany .............. 196 48 730
Jan. 30, 1997 [DE] Germany .............. 197 03 415

[51] Int. Cl.[7] ........................... F16K 31/02
[52] U.S. Cl. ..................... 251/129.06; 137/831
[58] Field of Search ................. 251/11, 129.06; 137/831, 832, 625.65

[56] References Cited

U.S. PATENT DOCUMENTS

| | | |
|---|---|---|
| 3,174,716 | 3/1965 | Salter .................. 251/129.06 |
| 4,450,375 | 5/1984 | Siegal ...................... 137/831 |
| 4,581,624 | 4/1986 | O'Connor .............. 137/831 |
| 5,340,081 | 8/1994 | Wright . | |
| 5,529,279 | 6/1996 | Beatty et al. . | |

FOREIGN PATENT DOCUMENTS

| | | |
|---|---|---|
| 0170173 | 7/1985 | European Pat. Off. . |
| 0704916 | 4/1996 | European Pat. Off. . |
| 2642812 | 2/1989 | France . |
| 4417251 | 11/1995 | Germany . |
| 195 11 022 | 6/1996 | Germany . |
| 3-103680 | 4/1991 | Japan . |
| 07158757 | 6/1995 | Japan . |

OTHER PUBLICATIONS

Rossberg et al., "Micro Liquid Dosing System", 1995, Microsystems Technologies.

Fernandez et al., "Properties of Piezoelectric Actuators", International Center for Actuators and Transducers.

Fernandez et al., "Tailoring Performance of Cymbal Actuators", International Center for Actuators and Transducers.

*Primary Examiner*—Kevin Shaver
*Assistant Examiner*—Eric Keasel
*Attorney, Agent, or Firm*—Beyer Weaver & Thomas, LLP

[57] ABSTRACT

A microvalve includes a micromechanically structured chip defining a valve seat with a flow opening therethrough, an elastic suspension device and an edge region. A valve plate is defined by a piezoelectric actuator and is connected to the edge region of the micromechanically structured chip. The longitudinal dimension of the piezoelectric actuator are able to be changed by the application of an electric voltage. A decrease in the longitudinal dimension of the piezoelectric actuator caused by the application of an electric voltage is mechanically converted into a movement of the valve plate relative to the valve seat essentially at a right angle to the longitudinal direction. The connection of the piezoelectric actuator with the edge region of the micromechanically structured chip and the suspension device causes the conversion. Thus, the valve plate will open or close the flow opening in the valve seat.

3 Claims, 4 Drawing Sheets

PIEZOELECTRICALLY ACTUATED MICROVALVE

This application is related to U.S. patent application No. 09/308,543, filed on May 20, 1999, and having the same title, which is hereby incorporated by reference.

BACKGROUND OF THE INVENTION

1. Field of the Invention

The present invention relates to micromechanically produced valves and especially to piezoelectrically operated microvalves.

2. Description of Prior Art

Microvalves can generally be used in the fields of pneumatics and fluidics for controlling the flow of gases and liquids, i.e. fluid flows. Such a valve can either have the function of a pilot valve or it can directly be used for controlling a volume flow or a pressure in a working piston or the like.

Piezoelectrically operated microvalves which are known at present and which are based on the inverse piezoelectric effect comprise a large piezoelectric ceramic which is fixed at one end in most cases and by means of which the fluid flow is controlled directly. Such a piezoelectrically operated silicon microvalve is described in R. Roßberg, B. Schmidt, S. Büttgenbach: "Micro Liquid Dosing System", Microsystem Technologies 2 (1995), pages 11 to 16, Springer-Verlag 1995. In such microvalves, either the piezoelectric ceramic itself can serve as a valve tappet or the valve tappet used is a tappet which is directly guided by the piezoelectric ceramic.

The microvalves described in the above publication are disadvantageous insofar as, for obtaining the deflection of the valve tappet over the valve seat which is necessary for a high flow rate, a very long piezoelectric ceramic is required, said valve tappet being also referred to as valve flap. For accommodating such a piezoelectric ceramic, it is, of course, also necessary to use a correspondingly large casing. It follows that the known piezo-operated microvalves, which are described e.g. in the abovementioned publication, have, in comparison with their construction size, a comparatively small valve opening, i.e. nominal width.

From A. Dogan, J. F. Fernandez, J. F. Tressler, K. Uchino, R. E. Newnham: "Properties of piezoelectric actuators"; Proceedings 5th International Conference on New Actuators 1996; Bremen 26th to 28th June 1996, and J. F. Fernandez, A. Dogan, J. F. Tressler, K. Uchino, R. E. Newnham: "Tailoring performance of cymbal actuators", Proceedings 5th International Conference on New Actuators, Bremen 26th to 28th June 1996, piezoelectric actuators are known, which consist of a piezoelectric ceramic material as a drive element which is arranged between two end covers having their edges connected to the ceramic material. By means of this arrangement, a lateral movement of the piezoelectric ceramic is converted into a large axial displacement at right angles to said end covers and amplified. As has been described in the publication "Tailoring performance of cymbal actuators", metals or metal alloys, e.g. zirconium, brass, low-carbon steel, molybdenum or tungsten, are used as end covers.

U.S. Pat. No. 5529279 describes a microactuator in which a thermal actuator is provided for driving a tappet, which is formed in a first substrate and which is supported in a diaphragm-like manner, for leaving an opening open and for closing it. A second substrate is connected to the first substrate and to a carrier in such a way that the tappet closes an opening which extends through said second substrate and which is in In the Abstract of JP-A-0715 8757, a microvalve is described in which a carrier plate having a passage opening is provided, a silicon diaphragm with a tappet-like portion of increased thickness being connected to said carrier plate for leaving said passage opening open or for closing it. The diaphragm is driven by a piezocomponent arranged on said diaphragm.

DE-A-4417251 describes a microvalve in which one or a plurality of passage openings in a carrier component are adapted to be closed by a movement of a closure member which is connected to said carrier component via elastic connection elements, said movement taking place at right angles to said carrier component as well as parallel thereto.

It is the object of the present invention to provide a piezoelectrically operated microvalve, the construction size of which is substantially smaller than that of known piezoelectrically operated microvalves and which, in addition, can be operated by smaller operating forces.

This object is achieved by a microvalve according to claim 1.

The present invention provides a microvalve comprising a micromechanically structured chip defining a valve seat with a flow opening therethrough, an elastic suspension device and an edge region. A valve plate is provided, which is defined by a piezoelectric actuator and which is connected to the edge region of the micromechanically structured chip, the longitudinal dimensions of said piezoelectric actuator being adapted to be changed by the application of an electric voltage. A decrease in the longitudinal dimensions of the piezoelectric actuator caused by the application of an electric voltage to said piezoelectric actuator is, due to the connection of said piezoelectric actuator with the edge region of the micromechanically structured chip and by means of the suspension device, mechanically converted into a movement of the valve plate relative to the valve seat essentially at right angles to the longitudinal direction, whereby the valve plate will open or close the flow opening in the valve seat.

The present invention is so conceived that a flow opening is provided within the valve seat which is implemented as a diaphragm portion of increased thickness, whereby the non-pressure-compensated area enclosed by the valve seat can be reduced and the force applied by the piezoactuator can be converted into an increased deflection and, consequently, into a higher flow rate through the valve.

By means of the microvalve according to the present invention, the construction size of piezoelectrically operated valves can substantially be reduced on the basis of a mechanical translation between a tappet and a piezoelectric actuator, said mechanical translation being provided by the suspension device of the tappet. By means of the lever translation, a comparatively small lateral shrinkage, i.e. a change in the dimensions of the piezoelectric ceramic in the longitudinal direction, is converted into a comparatively high vertical deflection of the valve tappet over the valve seat, i.e. a high deflection at right angles to the longitudinal dimensions of the piezoelectric ceramic. This permits large opening widths of the valve to be realized on a small area. In contrast to the hitherto known embodiments, the valves which will be described hereinbelow can, moreover, be mounted making use of a full-wafer connection technique which is generally used in the field of semiconductor technology. This means that a large number of identical components can be produced side by side ceramic. This permits large opening widths of the valve to be realized on a small area. In contrast to the hitherto known embodiments, the valves which will be described hereinbelow can, moreover, be mounted making use of a full-wafer connection technique which is generally used in the field of semiconductor technology. This means that a large number of identical components can be produced side by side on a substrate at the same time. The individual valves are then produced by dicing at the end of the manufacturing process. The use of this so-called batch process will increase the reproducability of the component specifications. By means of this kind of production it is possible to save costs, since the structures can be produced simultaneously, and to simplify production because the function can already be tested in the composite wafer structure.

The construction size of piezoelectrically operated microvalves having a structural design according to the present invention can be reduced drastically in comparison with known microvalves, the flow rate remaining, however, the same. This permits a higher packing density, e.g. in the case of so-called valve islands, so that e.g. pneumatically controlled machines can be reduced in size or actually be realized. Especially the use of microvalves in the field of motor vehicles is closely coupled with the construction size and the resultant weight of the microvalves. In addition, higher flow rates can be achieved when the hitherto used construction size is maintained. It follows that faster switching times, e.g. of working pistons, can be achieved. Due to the reduced construction size required for a given flow rate, the costs for the casing will be reduced as well.

BRIEF DESCRIPTION OF THE DRAWINGS

In the following, preferred embodiments of the present invention will be explained in detail making reference to the drawings enclosed, in which.

DESCRIPTION OF PREFERRED EMBODIMENTS OF THE INVENTION

Figure 1A:
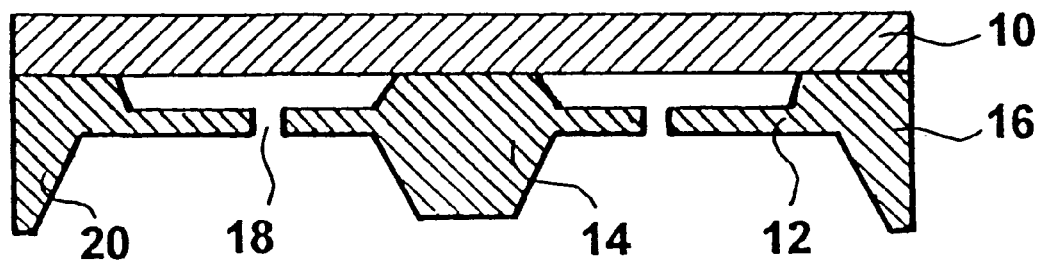
FIGS. 1A and 1B show schematic cross-sectional views for illustrating a piezoelectric actuator for a microvalve.
Figure 1B:
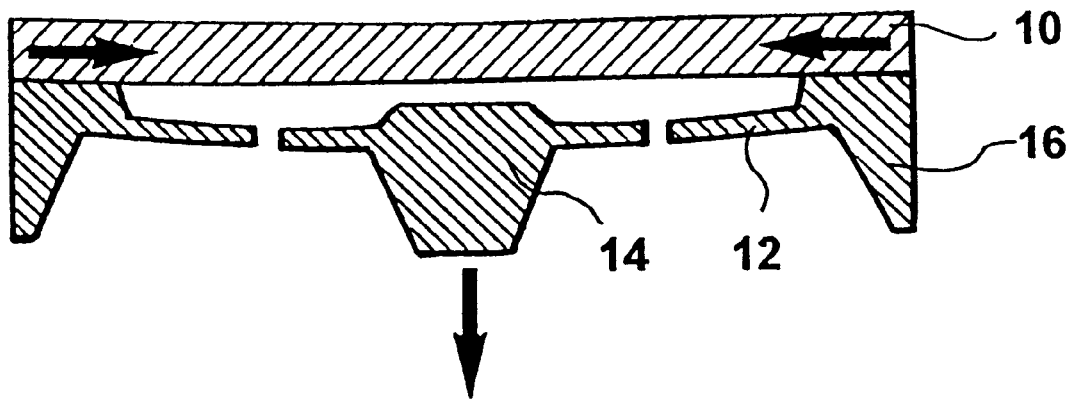

An actuator, which consists of a piezoelectric ceramic and of a tappet 14 secured to said piezoelectric ceramic 10 by means of a suspension device 12, is shown in FIG. 1A and 1B. The piezoelectric ceramic 10 serves as the actual drive. A voltage can be applied to the piezoelectric ceramic 10 in the usual way via electrodes (not shown) which are attached thereto.

The piezoelectric ceramic 10 has attached thereto a micromechanically structured chip 16. In a preferred embodiment, the chip is a semiconductor chip. The micromechanically structured chip 16 can be produced e.g. by means of conventional etching techniques. The chip material used can e.g. be silicon. Alternatively, the chip can also be a chip produced by means of an injection moulding process, e.g. a LIGA process (LIGA=lithography, electroforming), and can therefore consist of plastic material.

In the actuator shown in FIG. 1A and 1B, the chip is fixedly connected to the piezoelectric ceramic at all edges, whereas the tappet 14, which is located substantially at the centre of the micromechanically structured chip and which is secured to the elastic suspensions 12, is vertically movable. In a 2/2-way valve it is, however, not absolutely necessary that the chip is connected to the piezoelectric ceramic at all edges, since for the mode of operation of the piezoelectric actuation of the tappet it will suffice when the chip is connected to the piezoelectric ceramic at least at two spaced, preferably opposed ends thereof, the tappet being arranged in an area between the chip sections secured to the piezoelectric ceramic.

The elastic suspensions 12 can consist of a diaphragm which may be provided with openings 18 for pressure compensation. The elastic suspensions may, however, also consist of individual strips connecting the tappet 14 to the part of the micromechanically structured chip 16 which is secured to the piezoelectric ceramic. The micromechanically produced chip is provided with a border 20 extending away from the piezoelectric ceramic 10, said border being provided along the periphery of said chip and being used for fastening the actuator to a valve base element.

FIG. 1A shows the condition of the actuator when no voltage is applied to the piezoelectric ceramic 10. When a voltage is applied to the piezoelectric ceramic, the lateral dimensions of said piezoelectric ceramic 10 will diminish. This is shown by the arrows in the figures extending parallel to the piezoelectric ceramic, said arrows being shown e.g. in FIG. 1B. The micromechanically structured chip 16 which is connected to the piezoelectric ceramic 10 along the border thereof, is compressed when said lateral dimensions diminish; due to the lateral compressive stress occurring in the micromechanically structured chip 16, the tappet 14 tends to move in the vertical direction. This is indicated by the arrow in FIG. 1B. When the chip 16 has a suitable structural design, a lever action can be achieved in this way, which translates the small lateral shrinkage of the piezoelectric ceramic 10 into a high vertical deflection of the tappet 14 and which permits a large valve opening width in this way, whereas in microvalves having a conventional structural design the valve tappet follows directly the movement of the piezoelectric ceramic and its deflection is therefore limited to the deflection value of the piezoelectric ceramic.

Figure 2A:
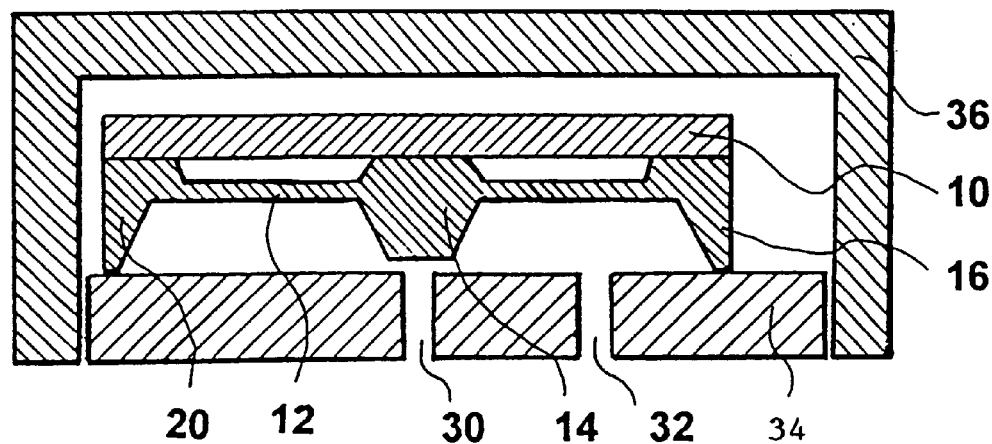
FIGS. 2A and 2B show schematic cross-sectional views of a first microvalve in the non-operative state and in the operative state, respectively.
Figure 2B:
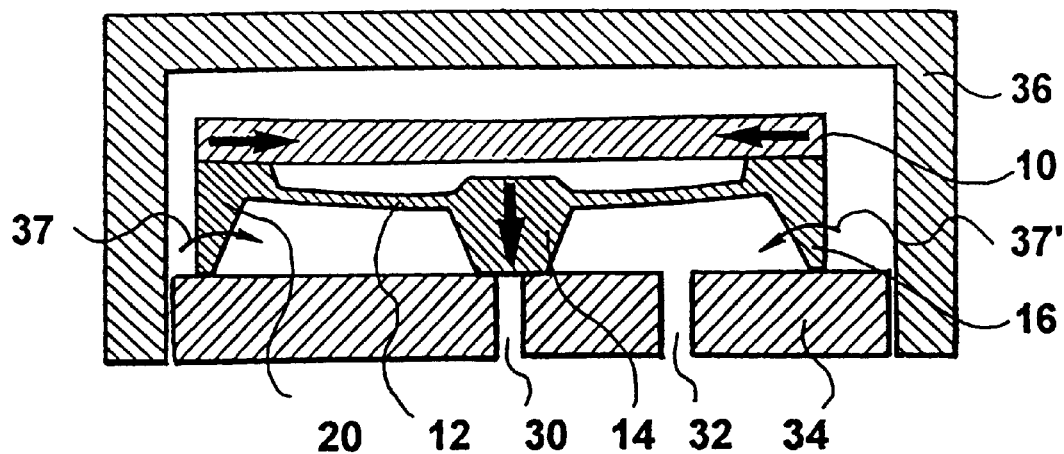

In FIGS. 2A and 2B, a first embodiment of a microvalve is shown. The valve in question is a 2/2-NO (=normally open) microvalve, which is provided with two paths, i.e. two passage openings, and two switching states, the microvalve being open in the deactivated state. In the embodiment of the microvalve shown in FIGS. 2A and 2B, the valve openings 30 and 32 are provided in a base plate 34 consisting e.g. of ceramics. In addition, the base plate 34 can also be used for electric contacting. The valve openings 30 and 32 have fluid connections (not shown) attached thereto, e.g. a consumer connection and a pressure connection.

The base plate 34 has secured thereto a microstructured tappet chip 16 along its border, i.e. along its peripheral projection 20, in such a way that the tappet 14 is freely movable in the middle of the micromechanically structured chip 16, said tappet chip 16 corresponding in this embodiment to the chip shown in FIG. 1A and 1B. The micromechanically structured chip 16 has additionally attached thereto a piezoelectric ceramic 10, as has been described with reference to FIG. 1A and 1B. The side of the tappet 14 facing the base plate 34 is slightly set back relative to the surface of the base plate 34, whereby the height of the valve opening is defined.

In the embodiment shown in FIG. 2A and 2B, the chip edge facing the base plate 34, i.e. the surface of the peripheral projection 20 secured to the base plate 34, is very narrow; this permits a stress-free rotational movement of the tappet chip. In the embodiment shown, the base plate 34 has additionally attached thereto a casing cover 36 which encapsulates the above-described arrangement and which can additionally be used as a gas guide means.

When an electric voltage is applied to the piezoelectric ceramic 10, said piezoelectric ceramic 10 will change its dimensions in the longitudinal direction, i.e. its lateral dimensions will diminish. In FIG. 2B this is again indicated by arrows extending parallel to the longitudinal dimensions of the piezoelectric ceramic 10. In the course of this process, the microstructured tappet chip 16, which is connected to the piezoelectric ceramic 10 along the border thereof, is compressed and tends to reduce the resultant lateral compressive stress by getting out of the way in the vertical direction. This vertical movement of the tappet 14 has the effect that the passage opening or valve opening 30 of the base plate 34 is closed. On the basis of the structural design of the microstructured tappet chip 16, a translation of a small lateral contraction of the piezoelectric ceramic 10 into a high vertical deflection of the tappet 14 can be achieved. The arrows 37 and 37' shown in FIG. 2B additionally indicate the almost stress-free rotatability of the tappet chip which is guaranteed by the narrow fastening area of the microstructured tappet chip on the base plate 34. By selecting the direction of the fluid flow through the valve, opening or, alternatively, closing of the valve can be supported, whereby an improved leak rate behaviour will be obtained.

Figure 3:
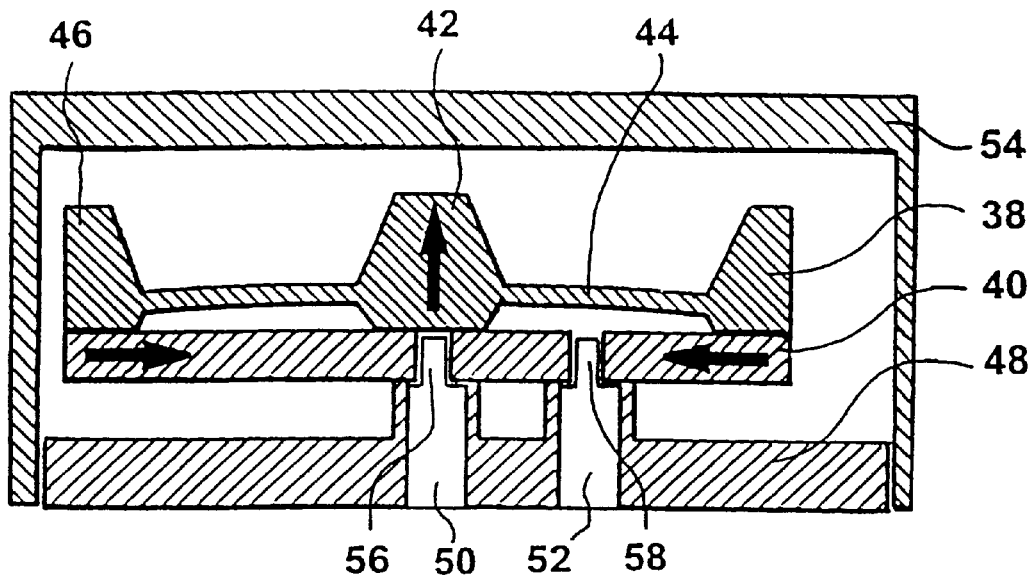
FIG. 3 shows a schematic cross-sectional view of an alternative microvalve in the non-operative state.

FIG. 3 shows a second embodiment of a microvalve. This embodiment is a 2/2-NC (=normally closed) valve, which is provided with two paths and two switching states and which is closed in the deactivated state. In the embodiment shown in FIG. 3, a micromechanically structured tappet chip 38 is again attached to a piezoelectric ceramic 40. The tappet chip 38 is again provided with a tappet 42 attached via an elastic suspension 44 to a part 46 of the tappet chip 38 which is connected to the piezoelectric ceramic 40 along the periphery of the tappet chip. In this case, the tappet chip is mounted on the piezoelectric ceramic 40 in such a way that the tappet 42 has already applied thereto a certain amount of mechanical prestress due to the mounting process and rests on the valve seat, whereby said valve seat is closed.

The embodiment shown in FIG. 3 again comprises a base plate 48, which consists e.g. of ceramics and which has two valve openings 50 and 52, and a casing cover 54. In this embodiment also the piezoelectric ceramic 40 is, however, provided with two passage openings 56 and 58. Via a fastening device, which, however, permits a lateral expansion and contraction of the piezoelectric ceramic 40, said piezoelectric ceramic 40 is connected to the base plate 48 in such a way that a fluid connection is established between the valve opening 50 of the base plate 48 and the passage opening 56 of the piezoelectric ceramic 40 and in such a way that the valve opening 52 of the base plate 48 is connected to the passage opening 58 of the piezoelectric ceramic 40.

In cases in which no voltage is applied to the piezoelectric ceramic, the tappet 42 of the embodiment of the microvalve shown in FIG. 3 closes the passage opening 56 in the piezoelectric ceramic 40 and, consequently, the valve opening 50 in the base plate 48, which is in fluid communication with said passage opening 56. When a voltage is applied to the piezoelectric ceramic 40, the longitudinal dimensions of said piezoelectric ceramic will diminish due to the inverse piezoelectric effect, said shrinkage being translated into an upward vertical movement of the tappet 42. This has the effect that the passage opening 56 in the piezoelectric ceramic 40 is opened and the valve opening 50 in the base plate 48 is therefore opened as well. In this valve the direction of the fluid flow can be chosen such that closure of the valve is supported. This will improve the closure and leak rate behaviour.

Figure 4:
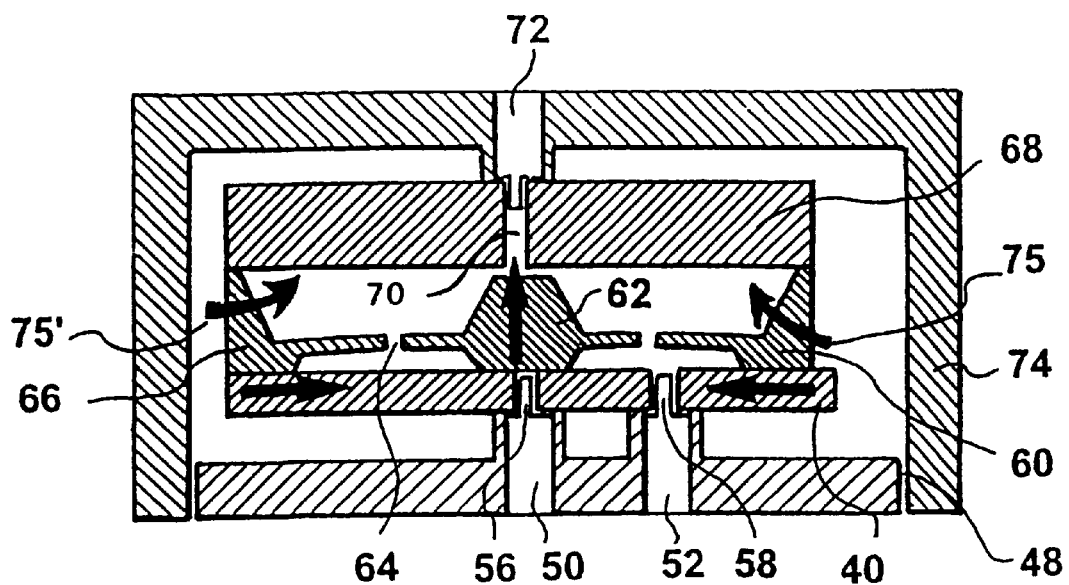
FIG. 4 shows a schematic cross-sectional view of a further microvalve in the non-operative state.

A third embodiment of a microvalve is shown in FIG. 4. In the embodiment shown in FIG. 4, the base plate 48 with passage openings 50, 52 and the piezoelectric ceramic 40 with passage openings 56 and 58 have the same structural design as in the case of the embodiment which has been described making reference to FIG. 3. The piezoelectric ceramic has again arranged thereon a micromechanically structured tappet chip 60. The elastic suspensions by means of which the tappet 62 is secured to the part of the tappet chip 60 fastened to the piezoelectric ceramic 40 are provided with fluid passages which are shown as openings 64, by way of example.

The micromechanically structured tappet chip 60 is again provided with a peripheral projection 66 having arranged thereon a further valve seat 68 in the third embodiment according to the present invention. The valve seat 68 is provided with a passage opening 70. The passage opening 70 is in fluid communication with a passage opening 72 of a casing cover 74 encapsulating the arrangement described. The almost stress-free rotatability, which is guaranteed by the narrow upper surface of the peripheral projection 66, is again indicated by the arrows 75 and 75' in FIG. 4.

The microvalve shown in FIG. 4 can be referred to as a 3/2-way valve. Such a valve has 3 paths and 2 switching states. In such a valve, a second valve seat is, of course, required. In the embodiment shown, this second valve seat is implemented by means of a further chip consisting e.g. of ceramics, silicon or the like. In such a 3/2 way valve, which has been described, by way of example, making reference to FIG. 4, the tappet chip is fully connected along its whole periphery to the piezoelectric ceramic as well as to the second valve seat, since fluid is conducted through the space between the chip and the piezoelectric ceramic and through the space between the chip and the second valve seat.

In the microvalve shown in FIG. 4, the valve opening 50 is closed in the strain-free condition of the piezoelectric ceramic 40. When a voltage is applied to the piezoelectric ceramic 40, the longitudinal dimensions of said piezoelectric ceramic 40 will diminish, whereby an upward vertical movement of the tappet 62 will be caused. The tappet 62 then closes the passage opening 70 in the second valve seat 68 and, consequently, the opening 72 in the casing cover 74.

For reasons of safety, 3/2 way valves are operated in the normally-closed mode in most cases, i.e. they are closed when no energy is applied. For this reason, it will be advantageous when the prestress applied to the valve tappet in the mounting process is chosen so high that, even if pressure is applied from below, the tappet will remain on the valve seat and the valve will therefore remain closed.

Figure 5:
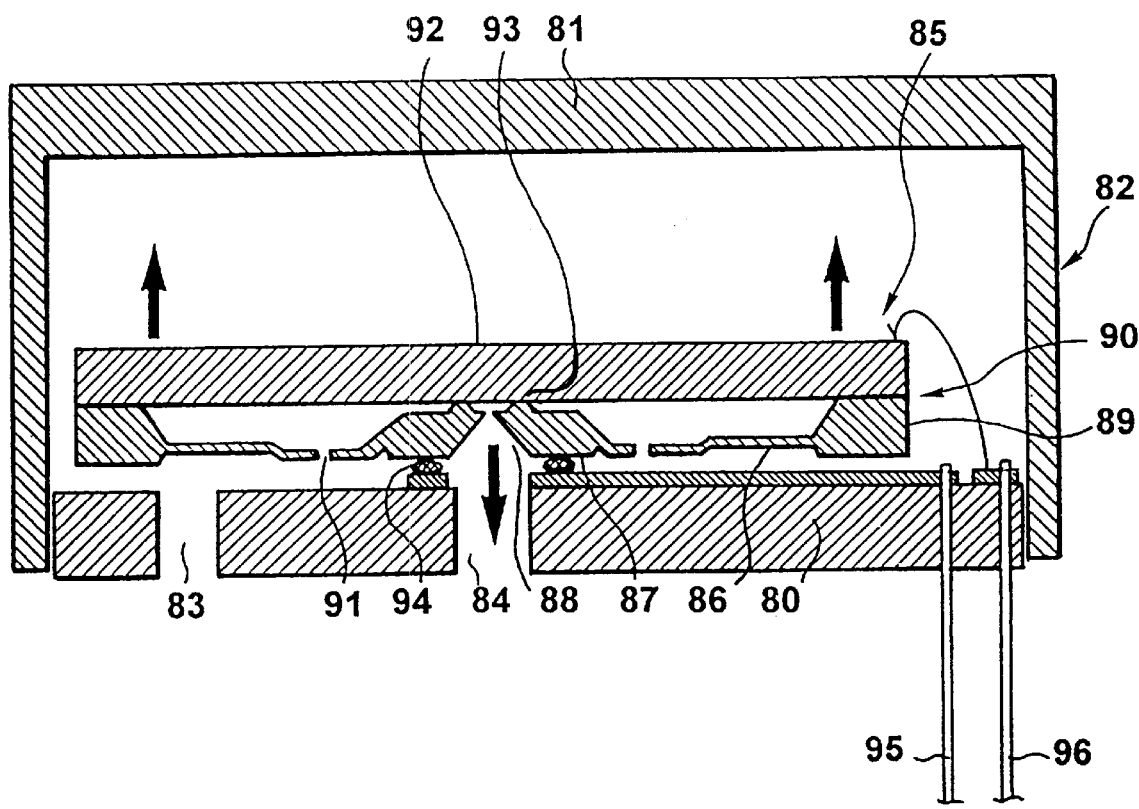
FIG. 5 shows a schematic cross-sectional view of an embodiment of the microvalve according to the present invention in the non-operative state.

FIG. 5 shows an embodiment of a microvalve according to the present invention. The embodiment of the microvalve shown in FIG. 5 comprises again a base plate 80 defining together with a casing cover 81 a valve casing 82. The base plate 80 includes, on the one hand, a pressure connection opening 83 and, on the other hand, a discharge opening 84 through which the controlled fluid can be supplied to a consumer. A valve structure 85 within the casing 82 comprises an elastic suspension 86 including, preferably in the central area thereof, a tappet 87 through which a flow opening 88 extends. The elastic suspension 86 extends from the central tappet 87, which can also be referred to as a valve seat in the case of the valve according to the present invention, up to an edge region 89, said edge region 89, the tappet 87 and the suspension 86 being formed integrally within a tappet chip by micromechanical production methods. In correspondence with the previously described embodiments, the tappet chip 90 can be produced from silicon by means of micromechanical methods.

Within the elastic suspension 86, fluid passage openings 91 are provided.

A valve plate 92 extends across the tappet chip 90, said valve plate 92 being firmly connected to the tappet chip 90 in the edge region 89 thereof. The tappet 87 is provided with a valve sealing edge 93 on its surface facing the valve plate 92; in the non-operative state of the valve, said valve sealing edge 93 abuts on the valve plate 92. The valve sealing edge 93 encloses the flow opening 88.

The side of the tappet facing away from the valve sealing edge 93 is secured to the base plate 80 in a fluid-tight manner, e.g. by an electrically conductive adhesive joint 94.

In the embodiment shown in the present connection, the valve plate 92 consists of a piezoelectric ceramic whose longitudinal dimensions change when an electric voltage is applied thereto.

Two voltage supply lines 95, 96 extend through the base plate 80. One of said lines is connected via the electrically conductive adhesive joint 94 to the tappet chip 90 which is electrically conductive as well, i.e. the valve-plate piezoelectric ceramic 92 is acted upon by said line on one side thereof, whereas a bonding wire establishes a connection between the other side of the valve-plate piezoelectric ceramic and the second line 96.

When a voltage is applied to the piezoelectric ceramic, which constitutes the valve plate 92 at the same time, the longitudinal dimensions of said piezoelectric ceramic will contract, whereby the valve plate 92, which is defined by the piezoelectric ceramic itself, will be raised from the valve sealing edge 93. In this operative state, a fluid connection will open, which leads from the pressure connection opening 83 through the fluid passage openings 91 and continues between the valve plate 92 and the valve sealing edge 93 to the flow opening 88, which extends through the tappet 87 and leads to the discharge opening 84 in the base plate 80.

In the embodiment according to FIG. 5 described hereinbefore, the piezoelectric ceramic constitutes the valve plate 92. To those skilled in the art it will, however, be apparent that the valve plate can also consist of an element which is formed separately from the piezoelectric ceramic and which is secured e.g. to the side of the piezoelectric ceramic facing the tappet 87.

In other words, as far as the aims of the present invention are concerned, it does not matter whether the piezoelectric actuator, which is formed by the piezoelectric ceramic in the present embodiment, also fulfills the function of the valve plate, which covers the passage opening within the tappet in the closed condition of the valve, or whether the valve plate is a separate element which is simply moved in a suitable manner relative to the tappet by the suspension 86 when the piezoelectric actuator is operated.

Deviating from the specially described embodiments, the present invention also comprises microvalves which differ from the above-described embodiments with regard to their structural design, the arrangement of the passage openings, etc., as long as valve tappet of these microvalves is actuated in the manner described in accordance with the present invention.

Hence, the present invention provides microvalves permitting comparatively large passage openings in combination with a comparatively small construction size. In addition, the microvalves according to the present invention permit a production of said microvalves by means of a full-wafer connection technique which is generally used in the field of semiconductor technology. It follows that, in comparison with known microvalves, the microvalves according to the present invention offer advantages with regard to simple production and, in addition, with regard to costs that can be saved when such microvalves are produced.

What is claimed is:

1. A microvalve comprising:
   a micromechanically structured chip defining a valve seat with a flow opening therethrough, an elastic suspension device and an edge region;
   a valve plate which is defined by a piezoelectric actuator and which is connected to the edge region of the micromechanically structured chip, the longitudinal dimensions of said piezoelectric actuator being adapted to be changed by the application of an electric voltage;
   wherein a decrease in the longitudinal dimensions of the piezoelectric actuator caused by the application of an electric voltage to said piezoelectric actuator is, due to the connection of said piezoelectric actuator with the edge region of the micromechanically structured chip and by means of the suspension device, mechanically converted into a movement of the valve plate relative to the valve seat essentially at right angles to the longitudinal direction, whereby the valve plate will open or close the flow opening in the valve seat.

2. A microvalve according to claim 1, comprising in addition
   a base element provided with a passage opening,
   wherein the valve seat is connected to said base element in such a way that the passage opening is in fluid communication with the flow opening.

3. A microvalve according to claim 1, wherein the valve seat is provided with a valve sealing edge on its side facing the valve plate, said valve sealing edge enclosing the flow opening and abutting on the valve plate in the non-operative condition of the microvalve.

* * * * *